(12) United States Patent
Totsu (10) Patent No.: US 8,083,453 B2
(45) Date of Patent: Dec. 27, 2011

(54) SCREW

(76) Inventor: Katsuyuki Totsu, Sumida-ku (JP)

(*) Notice: Subject to any disclaimer, the term of this patent is extended or adjusted under 35 U.S.C. 154(b) by 216 days.

(21) Appl. No.: 12/448,570

(22) PCT Filed: Nov. 8, 2007

(86) PCT No.: PCT/JP2007/071708
§ 371 (c)(1),
(2), (4) Date: Jun. 25, 2009

(87) PCT Pub. No.: WO2008/078460
PCT Pub. Date: Jul. 3, 2008

(65) Prior Publication Data
US 2010/0040432 A1    Feb. 18, 2010

(30) Foreign Application Priority Data
Dec. 27, 2006   (JP) .................... 2006-352472

(51) Int. Cl.
*F16B 35/00*   (2006.01)
(52) U.S. Cl. ............ 411/380; 411/426; 411/386
(58) Field of Classification Search .......... 411/426, 411/386, 418, 380
See application file for complete search history.

(56) References Cited

U.S. PATENT DOCUMENTS

| | | | | |
|---|---|---|---|---|
| 1,849,067 A * | 3/1932 | Bridges | ........................ | 403/334 |
| 2,278,411 A * | 4/1942 | Braendel | ..................... | 411/386 |
| 2,382,019 A * | 8/1945 | Miller | .......................... | 411/378 |
| 5,746,560 A * | 5/1998 | Barth et al. | .................. | 411/188 |
| 6,106,208 A * | 8/2000 | Lin | ............................... | 411/418 |
| 6,120,227 A * | 9/2000 | Murase et al. | ................ | 411/386 |
| 6,910,841 B2 * | 6/2005 | Isenberg | ...................... | 411/386 |
| 7,377,734 B2 * | 5/2008 | Bechtel et al. | ............... | 411/386 |
| 2006/0269288 A1 * | 11/2006 | Guidotti et al. | .............. | 398/135 |

FOREIGN PATENT DOCUMENTS

| | | |
|---|---|---|
| JP | S53-128458 | 10/1978 |
| JP | H5-14107 | 6/1993 |
| JP | H11-351221 | 12/1999 |
| JP | 2002-70824 | 3/2002 |
| JP | 2003-206918 | 7/2003 |
| JP | 2005-254444 | 9/2005 |
| JP | 2005-337406 | 12/2005 |

* cited by examiner

*Primary Examiner* — Gary Estremsky
(74) *Attorney, Agent, or Firm* — DLA Piper LLP (US)

(57) ABSTRACT

A screw which can be manufactured at a low cost with a relatively simple constitution by performing precise machining suitable for tightening a screw without employing a tapping thread structure as a threaded portion shape and machining only the distal end of the threaded portion to have a shape projecting spherically, and which can ensure smooth and quick screw tightening work without causing such problems as heat generation or molding powder at all at screw tightening. The screw includes a head (12) provided with a bit fitting groove (13) at one end, and a threaded portion (14) which is machined precisely with substantially equal circular diameter over a full length, wherein the distal end (20) of the threaded portion (14) is shaped to have a spherical projection varying in a plurality of stages.

2 Claims, 6 Drawing Sheets

SCREW

TECHNICAL FIELD

The present invention relates to an improvement in the shaft of a screw and, in view of the fact that various types of electronic products, which are rapidly prevailing and increasingly mass-produced, are becoming smaller and lighter, and a great amount of small-sized screws are used in the assembling work of such electronic products, more particularly relates to a screw in which tightening work of such small-sized crews on a screw-mounting object is accomplished quickly, reliably and accurately.

BACKGROUND ART

Currently, aluminum alloys, magnesium alloys and plastic are employed for boards used as assembling components in various types of electronic products such as personal computers, cell phones, digital cameras, LCD (Liquid Crystal Display) televisions, plasma televisions, printers, copiers and other products incorporated with computer systems. This to meet the demands for more compact, lighter, and thinner products; and those boards are tending to become thinner. For this reason, it is necessary, as described above, to use large numbers of small-sized screws in assembling of these products and to quickly, reliably and accurately perform screw-mounting and tightening work. Also, the trend for LCD and plasma TV screens to become larger in recent years has increased the number of screws used since the above-described boards used in them become longer in size.

In order to quickly mount screws when assembling the above-described electronic products, a large number of screw holes are pre-installed at required locations on assembly component boards; and these large number of screw holes are formed simultaneously during the molding and machining works of the boards which are under the conditions described above. Accordingly, it is inevitable that these screw holes experience subtle changes in, for instance, the position and the shape due to the temperature and machining states of the board during the molding and machining work. When misalignment phenomena of the screws occur between, for example, a substrate and a mounting board, the screws may be unable to be screwed smoothly into the substrate when the screws are positioned in the screw holes installed on the mounting board and tightened.

In the past, tapping screws are generally used when products are to be assembled with small-sized screws. More specifically, tapping screws are positioned in place in prepared pilot holes of an assembly component and screwed in, thus fixing the parts while the tapping screws form internal threads in the pilot hole. However, in such cases a difficulty arises that tapping of the internal threads creates frictional heat and molding powders that can cause damages and breakdown in, for example, the electronic parts.

To solve the above-described problems, an internal-thread-forming tapping screw has been proposed, In this internal-thread-forming tapping screw, the pitch of the threads is relatively larger, the groove portions of the screw are formed in a relatively large interval, and at least 60%, starting from the tip end of the threaded portion of the total length of the threaded portion where the thread is formed, is coated with a resin adhesive in which epoxy-type adhesives are encapsulated in microcapsules (see patent document 1).

Also, when putting together assembly components, surface treatments such as painting or plating is occasionally applied after tapping the internal threads to a frame or assembly components. In such a case, the internal threads would become slightly smaller due to the surface treatment, or paint would get into the tapped holes, making it difficult for the male threads of bolts and set screws of corresponding size to enter thereinto. Also, when removing assembly components, internal threads can be damaged or rust may occur on the internal threads when previously-prepared internal threads are subsequently used to put together the original assembly components or new assembly components; and this makes it difficult for the male threads to enter.

A known way to repair internal threads is to use a hand-turning tap when the problems as described above occur with the internal thread. However, this task is extremely troublesome. For that reason, a tap (tool) has been proposed to replace the hand-turning tap. This tap (too) is configured such that a cutting edge is provided on the outer perimeter of the threaded portion, and at least one groove that can eject the cut chips is also provided; and this tap (tool) is screwed into the internal threads to repair internal threads that have become difficult for male threads to enter. Such a repair work can be done very easily with this tool.

Also, when mounting and tightening are done using small-sized screws for the product assembly as described above, studs, spacers, or the like equipped with internal threads are used to ensure heat radiation paths for heat generated in, for instance, electronic components. In these cases as well, the same problems as described above occur when mounting male threads in internal threads.

To resolve the above-described problems, a loose preventive male screw has been proposed. In this screw, the threaded portion is divided into two parts, a screw head portion and a distal end side, to provide a first area of threads and a second area of threads; and the threads in the distal end side is shaped such that the threads gradually increase in outer diameter from the tip end to form a tapping thread that is larger in diameter than the threads in the screw head portion (see patent document 3).

Patent document 1: Japanese Patent Application Laid-Open (Kokai) No. 2002-70824
Patent document 2: Japanese Patent Application Laid-Open (Kokai) No. 2005-254444
Patent document 3: Japanese Patent Application Laid-Open (Kokai) No. 2005-337406

DISCLOSURE OF THE INVENTION

Problem that the Invention is to Solve

With the internal-thread-forming tapping screw disclosed in the above-described patent document 1, tapping process is still involved. Accordingly, not only is it unable to avoid production of heat through friction, it also had problems such as troublesome machining on the threaded portion for recovering the molding powder (cut chips) and increased cost in screw manufacturing.

Also, the tap (tool) disclosed in the above-described patent document 2 is used in place of a male screw when problems occur with the internal thread; and after the internal thread is repaired by tapping, the male screw is remounted again. Thus, the screw-mounting process is extremely troublesome, resulting in a shortcoming that it is not suited for assembly work that is to improve the product production efficiency.

Further, the male screw that prevents loosening disclosed in the above-described patent document 3 has the same tapping-screw function as the internal-thread-forming tapping screw of the patent document 1, and it is not only unable to resolve the problem of heat generation and molding powder (cutting chips), but it also has shortcomings of, for instance, making the structure of the threaded portion complex and increasing the manufacturing cost.

So as to speed up the screwing-in of male threads, it has been further proposed to shape the distal end part of the threaded portion of a screw tapered and pointed further. However, while this kind of shaping can accomplish a similar effect to the one above-described, the screw supply path can be damaged by the tip ends of the sharpened or pointed screws when the screws used, for instance, in an automatic tightening machine are automatically supplied, and further, additional problems such as jamming of screws at the damaged portion of the path would occur. Therefore, screws for which the shape of the distal end part of the threaded portion is sharpened in this way are particularly used as, for example, architectural screws by forming the cutting edge on a part of the threaded portion and by forming the sharpened tip end as a drill part, and they are ultimately not suitable as screws used for assembly of the above-described electronic products.

In view of the situations described above, the inventor, after numerous studies and prototypes, found a way to resolve the problems with the misaligned screw holes, while basically eliminating the function of tapping screw, by creating a screw that has a distal end part of the threaded portion projecting in a spherical shape so that it can correct the positions of screw hole, making it possible to perform smooth and adequate screwing of the threaded portion into, for example, screw holes that have become constricted due to misalignment.

In this screw, the structure is a relatively simple in which the threaded portion is precisely machined so as to be suitable for tightening, and the shape of only the distal end part of the threaded portion is formed to project in a spherical shape. Accordingly, it is confirmed that the screw can be machined easily with, for example, a die, and it does not cause the manufacturing cost to increase compared to the conventional screws and in addition, the tightening work can be performed smoothly and quickly without creating such problems as heat generation and molding powder production when being tightened.

It is also found that the tightening effect can be accomplished more efficiently by shaping the distal end part of the threaded portion of a screw to project in a spherical shape by, for example, shaping the distal end part of the threaded portion so that the outer diameter narrows towards the tip end while also varying the diameter gradually in two stages or a plurality of stages of two or more than two in a tapered shape or curving shape, allowing the distal end to project in a spherical shape.

It is further found that with at least one groove that is formed in one part of the outer circumference so as to cross from the distal end side of the threaded portion to the spherically projected distal end part so as to extend parallel to the axial direction of the threaded portion, it is possible to improve, among others, the loosening-prevention function and the screw-in function of the screw.

In view of the above, the object of the present invention is to provide a screw in which the shape of the threaded portion does not have a tapping thread structure and is formed precisely by machining, and only the distal end part of the threaded portion is formed so as to have a spherically projected shape, so that the screw has a relatively simple structure and can be manufactured at a low cost, and in addition, the screw ensures smooth and quick tightening work without causing any problems with heat generation and molding powder production during the tightening.

Means to Solve the Problem

In order to accomplish the above-described object, the screw of the present invention comprises a screw head and a threaded portion, the screw head, which is at one end of the screw, is formed with a bit-fitting groove, and the threaded portion is machined precisely to have a substantially equal diameter for an entire length thereof; and the screw is characterized in that the distal end part of the threaded portion is shaped to have a spherical projection that varies in a plurality of stages.

The screw of the present invention comprises a screw head and a threaded portion, the screw head is provided at one end of the screw and formed with a bit-fitting groove, and the threaded portion is machined precisely to have a substantially equal diameter for an entire length thereof with an outer diameter of its distal end side narrowed gradually, and this screw is characterized in that the distal end part of the threaded portion is shaped to have a spherical projection that varies in a plurality of stages.

The screw of the present invention comprises a screw head and a threaded portion, the screw head is provided at one end of the screw and formed with a bit-fitting groove, and the threaded portion is machined precisely to have a substantially equal diameter for an entire length thereof, and the screw is characterized in that in the distal end side of the threaded portion the outer diameter is narrowed gradually in stages, and the distal end part of the threaded portion is shaped to have a spherical projection that varies in a plurality of stages.

The screw of the present invention is characterized in that the shape of the distal end part of the threaded portion that projects spherically has two stages comprising a base part that arises from the axial diameter of the threaded portion and a distal projection part that narrows to a diameter of two thirds (⅔) or less of the axial diameter of the threaded portion and projects in a spherical shape.

The screw of the present invention is characterized in that the base part that arises from the axial diameter of the threaded portion is formed in a tapered shape.

The screw of the present invention is characterized in that the base part that arises from the axial diameter of the threaded portion is formed to project in a curved shape.

The screw of the present invention is characterized in that in the distal end side of the threaded portion at least one groove that extends parallel to the axial direction of the threaded portion is provided in one part of the outer circumference so as to cross from the distal end side of the threaded portion to the distal end part that projects spherically.

The screw of the present invention is characterized in that the at least one groove provided in the distal end side of the threaded portion has a first crossing surface that is parallel to the screw axis direction and vertical with respect to the direction of rotation of the screw and faces the direction opposite from the tightening direction of the screw.

The screw of the present invention is characterized in that the above-described at least one groove provided in the distal end side of the threaded portion has a second crossing surface that is parallel to the screw axis direction and vertical with respect to the direction of rotation of the screw and faces the tightening direction of the screw.

In one embodiment of the screw of the present invention, the distal end part of the threaded portion projects spherically. Accordingly, screwing of the threaded portion into, for example, a screw hole that is narrowed can be accomplished adequately and smoothly. In particular, the structure is a relatively simple wherein the screw is formed precisely so as to be suited for being tightened without having the function of a tapping screw and is formed so that the shape of only the distal end part of the threaded portion is formed so as to project spherically. Accordingly, the screw can be machined easily by, for example, a die, does not increase the manufacturing costs compared to the conventional screws, does not cause any problem with heat generation and molding powder (cutting chips) production during tightening, and makes smooth and quick tightening possible.

In one embodiment of the screw of the present invention, the shape of the distal end part of the threaded portion that projects spherically is formed so as to have two stages comprising a base part that arises from the axial diameter of the threaded portion and a distal projection part that narrows to a diameter of two thirds (⅔) or less of the axial diameter of the threaded portion and projects in a spherical shape. Accordingly, it is possible to easily accomplish smooth and fast screwing with respect to the misaligned screw holes. Furthermore, it is advantageous, in forming the screw, to have the distal end part projected in two stages and to shape the base part in a tapered shape or in a curvedly projected shape; and this makes it possible that the screw accomplishes the function and advantages effectively and sufficiently.

In or embodiment of the screw of the present invention, in the distal end side of the threaded portion at least one groove that extends parallel to the axial direction of the threaded portion is formed in one part of the outer circumference so as to cross from the distal end side of the threaded portion to the distal end part that projects spherically. With this structure, it is possible that the screw has a loosening-prevention function, an enhanced screw-in function and the like in addition to the above-described function and effect.

BEST MODE FOR CARRYING OUT THE INVENTION

Next, embodiments of the screw according to the present invention will be described in detail with reference to the accompanying drawings.

Embodiment 1

Figure 1:
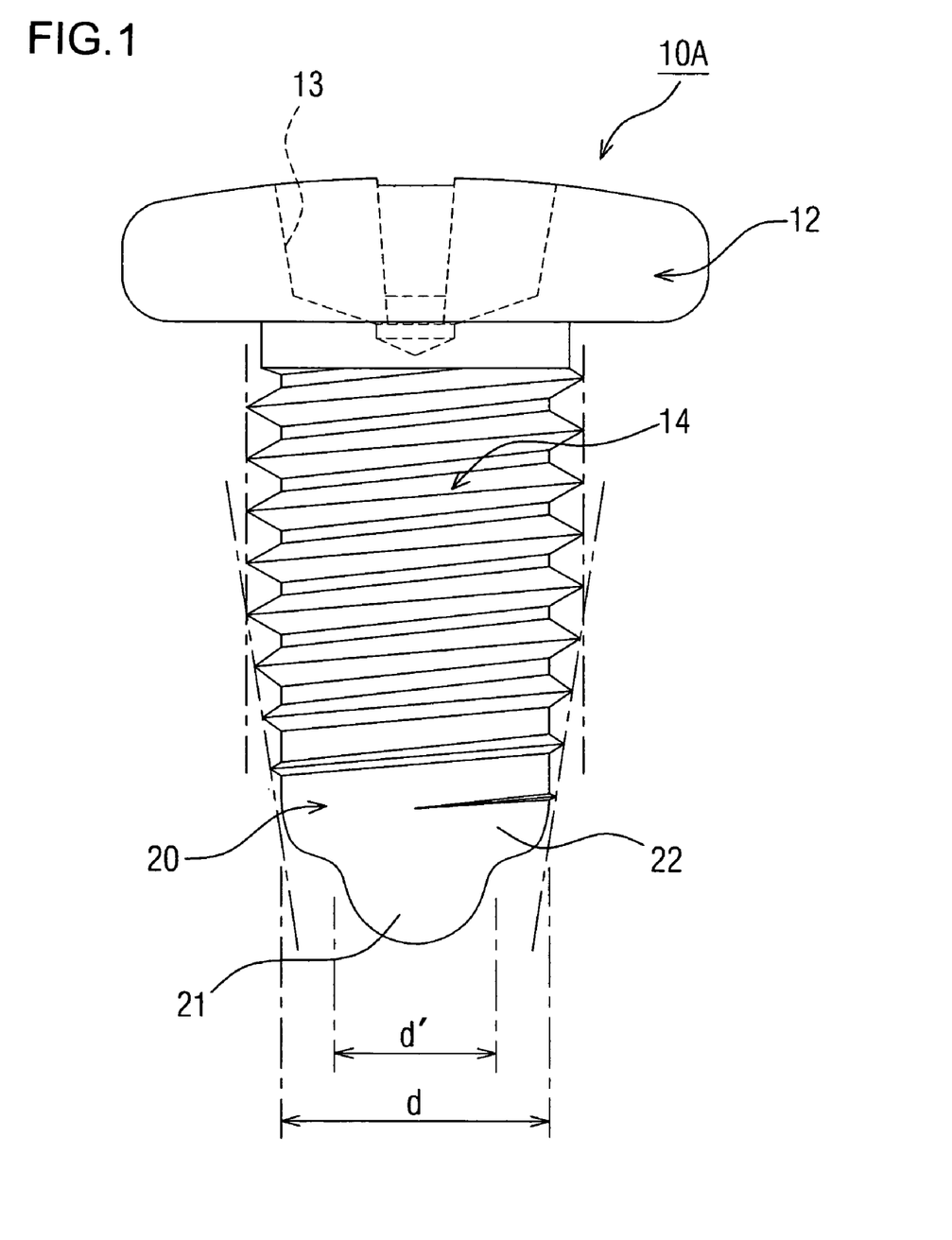
FIG. 1 is an exterior side view showing one embodiment of the screw of the present invention.

FIG. 1 is an external side view showing one embodiment of the screw of the present invention. More specifically, in FIG. 1, the reference numeral 10A indicates a screw of the present embodiment, and the screw 10A is comprised of a screw head 12, which is provided at one end of the screw and formed with a bit-fitting groove 13, and a threaded portion 14, which is precisely machined with a substantially equal diameter along its entire length; and in this screw 10A, the distal end part 20 of the threaded portion 14 is shaped so as to have a spherical projection that varies (in diameter) in a plurality of stages. In this case, as shown in the figure, the threaded portion 14 can take such a structure that the distal end side is machined precisely so that its outer diameter of the threads narrows gradually and the shape of the distal end part 20 of the threaded portion 14 is structured to project spherically in two stages.

More specifically, in the screw 10A of the present embodiment, the shape of the spherically-projecting distal end part 20 of the threaded portion 14 is structured so that it projects in a spherical shape that varies in a plurality of stages and its diameter d narrows gradually towards the tip end of the threaded portion 14. Therefore, in the shown example, the shape of the distal end part 20 that projects spherically from the threaded portion 14 is structured to project spherically, varying in two stages comprising a base part 22 that arises from the axial diameter d of the threaded portion 14 and a distal projection part 21 that narrows to a diameter d' which is two thirds (⅔) or less of the axial diameter d. Furthermore, in this case, as shown in the figure, the base part 22 that arises from the threaded portion 14 is preferably projected in a curved shape and also in contact with the entire boundary area with the distal projection part 21 by a curved surface.

Figure 2:
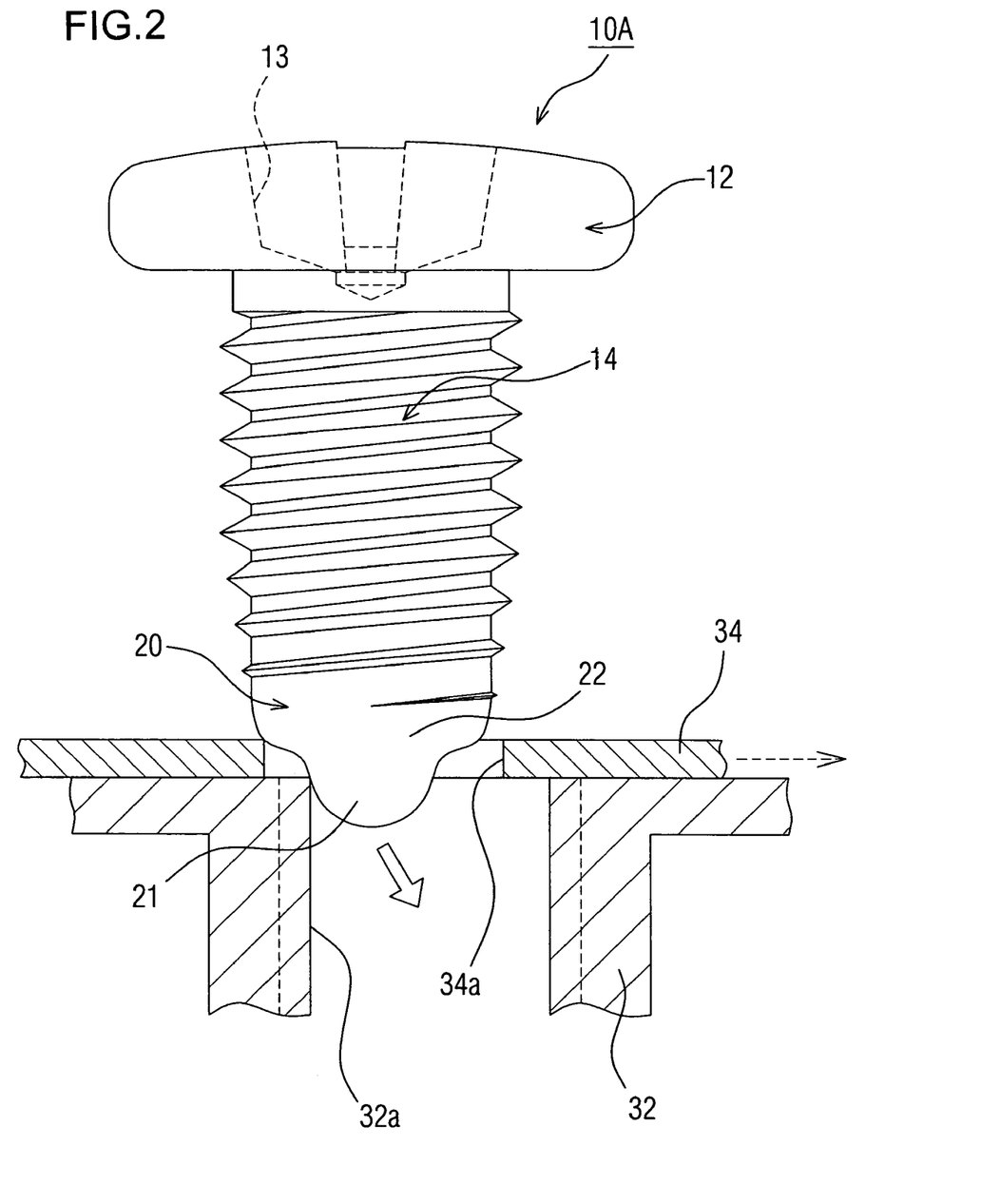
FIG. 2 is a schematic diagram showing the manner of use of the screw shown in FIG. 1.

Therefore, according to the thus structured screw 10 of the present embodiment, when, as shown in FIG. 2, misalignment of screw holes 32a and 34a occurs between, for example, a substrate 32 and a mounting board 34, the screw 10A is first positioned in the screw hole 34a of the mounting board 34, and then the screw is tightened so that the distal projection part 21 of the distal end part 20 of the threaded portion 14 fits easily into the screw holes 32a and 34a which have actually become narrower (due to the misalignment), thus allowing accurate positioning of the screw to be accomplished.

Next, when the tightening begins, the screw 10A is pressed, with respect to the misaligned screw holes 32a and 34a, from the distal projection part 21 that projects spherically at the distal end part 20 of the threaded portion 14 toward the curved base part 22; as a result, the mounting board 34 is moved in the direction of the arrow shown by dotted lines, the screw holes 32a and 34a are gradually corrected so that they are aligned, and as a result the threaded portion 14 is screwed in smoothly. Accordingly, in the screw 10A of the present embodiment, the threaded portion does not have a tapping thread structure and is formed by precise machining, and the movement displacement from the distal projection part 21 formed at the distal end part 20 of the threaded portion 14 to the threaded portion 14 through the curved base part 22 is smoothly accomplished; and in addition, the screw ensures smooth and quick tightening work without causing any problems with heat generation and molding powder production during the tightening.

Further, it is possible for the threaded portion 14 of the screw 10A of the present embodiment to take such a structure that the threaded portion 14 is precisely machined with substantially equal diameter for its entire length so that the outer diameter narrows gradually in stages in the distal end side of the threaded portion, and the thus formed distal end is spherically projected so as to vary in a plurality of stages as described above.

Embodiment 2

Figure 3:
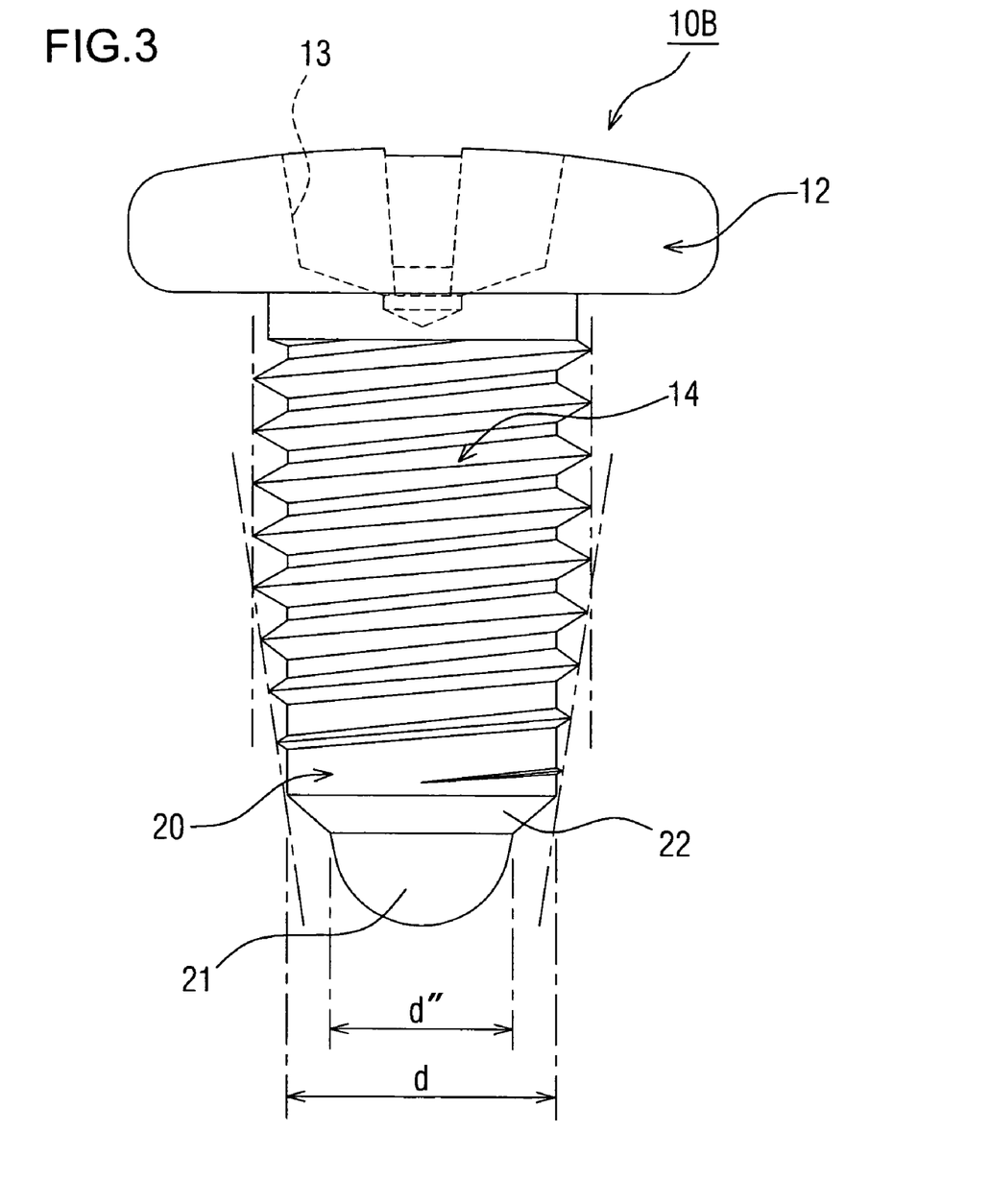
FIG. 3 is an exterior side view showing a different embodiment of the screw of the present invention.

FIG. 3 is an exterior side view of another embodiment of the screw of the present invention. For ease of explanation, the structural elements that are the same as those of the screw 10A in the embodiment shown in FIG. 1 will be explained using the same reference numerals, and their detailed explanation will be omitted.

In FIG. 3, a screw 10B of the present embodiment is comprised of a screw head 12, which is provided at one end of the screw and formed with a bit-fitting groove 13, and a threaded portion 14, which is precisely machined with substantially equal diameter for its entire length; and the distal end part 20 of the threaded portion 14 is, as in the above-described embodiment 1, shaped to project spherically so as to vary in a plurality of stages so that the diameter d narrows gradually toward the tip end of the threaded portion 14. In this embodiment, the base part 22 that arises from the threaded portion 14 is formed in a tapered shape, and the distal projection part 21 projects spherically in two stages with its diameter d" is narrowed in two thirds (⅔) or less of the axial diameter d.

Figure 4:
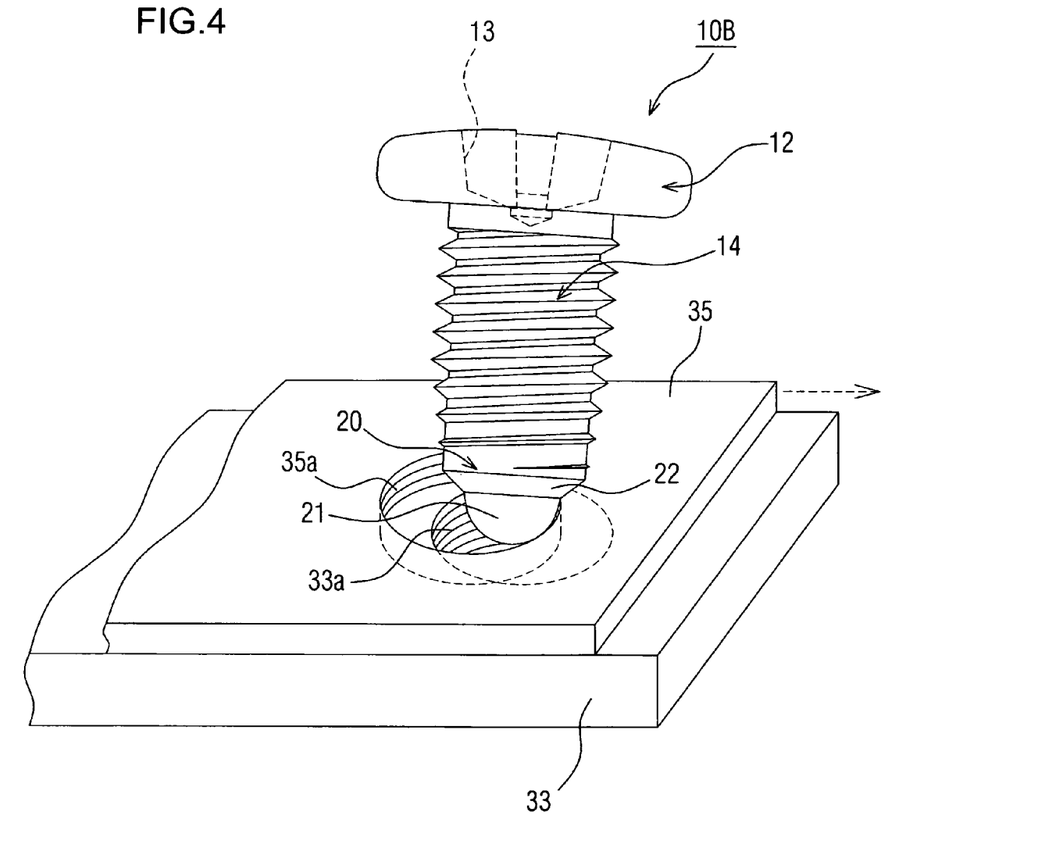
FIG. 4 is a schematic diagram showing the manner of use of the screw shown in FIG. 3.

In this screw 10B of present embodiment thus structured, smooth and fast screwing-in can be, as in the above-described embodiment, easily accomplished for the misaligned screw holes and the like. For instance, when a long mounting board 35 is to be mounted on a prescribed mounting object 33 as shown in FIG. 4, misalignment would be created between the position of screw holes 35a provided respectively in advance at two locations separated in the direction of length of the mounting board 35 and the position of certain screw holes 33*a* respectively provided in the mounting object 33, making screwing difficult. For this reason, a known method is to form at least one of the screw holes 35*a* located in the direction of length in an oval shape longer in the direction of length to allow for alignment with the screw holes 33*a* of the mounting object 33. In this case, after tightening the screw 10B in one of the screw holes 35*a* provided in the mounting board 35, misalignment may sometimes occur between the positions of the other screw hole 35*a* and the screw hole 33*a* when tightening the screw 10B into the other screw hole 35*a*. In such a case, according to the screw 10B of the present embodiment, into the screw holes 33*a* and 35*a* that have virtually become narrower, the distal projection part 21 of the distal end part 20 of the threaded portion 14 fits easily into screw the holes 33*a* and 35*a*, and thus accurate positioning can be accomplished.

Next, when the tightening begins, the screw 10B is pressed, with respect to the misaligned screw holes 33*a* and 35*a*, from the distal projection part 21 that projects spherically at the distal end part 20 of the threaded portion 14 toward the tapered base part 22; as a result, the mounting board 35 is moved in the direction of the arrow shown by dotted line, the screw holes 33*a* and 35*a* are gradually corrected so that they are aligned, and the threaded portion 14 is screwed in smoothly. Accordingly, in the screw 10B of the present embodiment, the threaded portion 14 does not have a tapping thread structure and is formed by precise machining, and the movement displacement from the distal projection part 21 formed at the distal end part 20 of the threaded portion 14 to the threaded portion 14 through the tapered base part 22 is smoothly accomplished; and in addition, the screw ensures smooth and quick tightening work without causing any problems with heat generation and molding powder production during the tightening.

Further, it is possible for the threaded portion 14 of the screw 10B of the present embodiment, as in the screw 10A, to take such a structure that the threaded portion 14 is precisely machined with substantially equal diameter for its entire length so that the outer diameter narrows gradually in stages in the distal end side of this threaded portion, and the thus formed distal end part is spherically projected so as to vary in a plurality of stages as described above.

Embodiment 3

Figure 5:
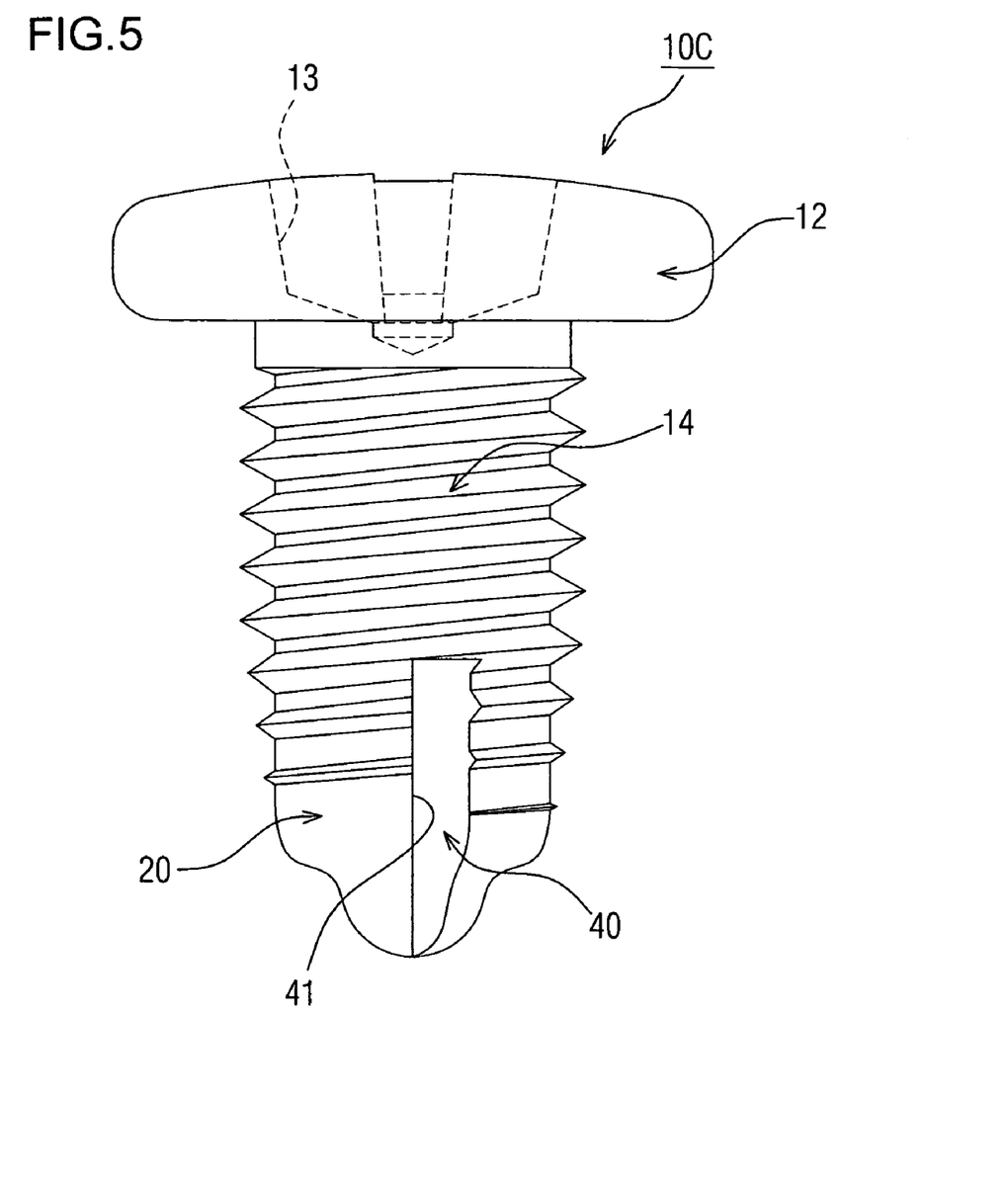
FIG. 5 is an exterior side view showing a further different embodiment of the screw of the present invention.

FIG. 5 is an exterior side view of still another embodiment of the screw of the present invention. For ease of explanation, the structural elements that are the same as those of the screw 10A in the embodiment shown in FIG. 1 will be explained using the same reference numerals, and their detailed explanation will be omitted.

In FIG. 5, in screw 10C of the present embodiment the distal end side of the threaded portion 14 of the screw 10A described in the above Embodiment 1 is provided with at least one groove 40 that is cut in the threaded portion 14 and extends parallel to the axial direction of the threaded portion so as to be in one part of the outer circumference and crosses from the distal end side of the threaded portion 14 to the distal end part 20 that projects spherically. The structure of this screw 10C of the present embodiment can be applied without modification to the screw 10B described in the Embodiment 2.

In the screw 10C of this embodiment, the above-descried at least one groove 40 cut in the distal end side of the threaded portion 14 has a first crossing surface 41 that is parallel to the screw axis direction and vertical with respect to the direction of rotation of the screw 10C and faces the direction opposite from the tightening direction of the screw 10C. Because of the structure described above, it is possible to accomplish a loosening-prevention function, an enhanced screw-in function and the like with the first crossing surface 41.

Embodiment 4

Figure 6:
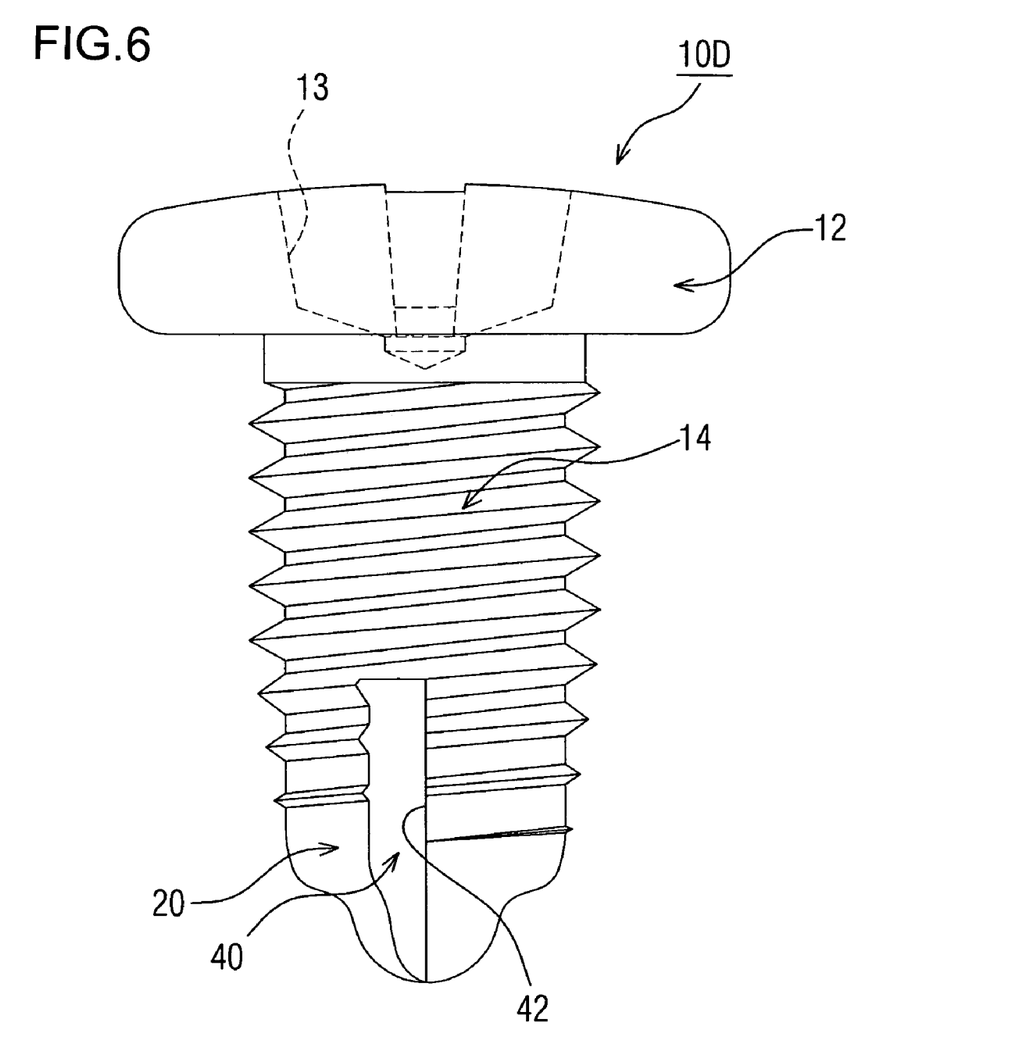
FIG. 6 is an exterior side view showing another embodiment of the screw of the present invention.

FIG. 6 is an exterior side view of a further embodiment of the screw of the present invention, and this screw is a modification of the above-described embodiment shown in FIG. 5. For ease of explanation, the structural elements that are the same as those of the screw 10A in the embodiment shown in FIG. 1 will be explained using the same reference numerals, and their detailed explanation will be omitted.

In FIG. 6, a screw 10D of the present embodiment, as in the screw 10C of the embodiment shown in FIG. 5, is provided in the distal end side of the threaded portion 14 with at least one groove 40 that is cut in the threaded portion 14 and extends parallel to the axial direction of the threaded portion so as to be in one part of the outer circumference and crosses from the distal end side of the threaded portion 14 to the distal end part 20 that projects spherically. In the present embodiment as well, the structure of this screw 10D can be applied without modification to the screw 10B described in the Embodiment 2.

In the screw 10D of the present embodiment, the above-descried at least one groove 40 cut in the distal end side of the threaded portion 14 has a second crossing surface 42 that is parallel to the screw axis direction and vertical with respect to the direction of rotation of the screw 10D and faces the tightening direction of the screw 10D. Because of the structure described above, it is possible to accomplish a loosening-prevention function, an enhanced screw-in function and the like with the second crossing surface 42.

Preferred embodiments of the present invention are described above; however, the present invention is not limited to the above embodiments, and many other design changes can be made as long as they do not depart from the gist of the present invention. For example, not only can design changes be made for the shape structure in the threaded portion, for the shape structure in which the outer diameter of the threaded portion decreases, for the shape structure of the distal end part, and for the shape structure in which the diameter of the distal end part is varied in a plurality of stages, various appropriate design changes can also be made for the shape structure for the groove that extends in parallel to the axial direction of the threaded portion so as to be in one part of its outer circumference and crosses from the distal end side of the threaded portion to the spherically projecting distal end part.

DESCRIPTION OF THE REFERENCE NUMERALS

10A, 10B, 10C, 10D Screw
12 Screw head
13 Bit-fitting groove
14 Threaded portion
20 Distal end part
21 Distal projection part
22 Base part
32 Substrate
32a Screw hole
33 Mounting object
33a Screw hole
34 Mounting board
34a Screw hole
35 Mounting board
35a Screw hole
40 Groove
41 First crossing surface
42 Second crossing surface

The invention claimed is:

1. A screw comprising a screw head formed with a bit-fitting groove and a single threaded portion having first and second portions wherein the first portion is of constant diameter and the second portion extends continuously from the first portion and has a diameter tapering from the first portion, and wherein
a distal end part of the threaded portion is provided with:
a base part that arises from an axial diameter of the threaded portion and is formed in a tapered shape, and
a distal projection part that projects in a spherical shape from a center of the base part and narrows to a diameter of two thirds or less of said axial diameter,
so that said distal end part has a spherical shape varying in two stages.

2. A screw comprising a screw head formed with a bit-fitting groove and a single threaded portion having first and second portions wherein the first portion is of constant diameter and the second portion extends continuously from the first portion and has a diameter tapering from the first portion, and wherein
a distal end part of the threaded portion is provided with:
a base part that arises from an axial diameter of the threaded portion and is formed to project in a curved shape, and
a distal projection part that projects in a spherical shape from a center of the base part and narrows to a diameter of two thirds or less of said axial diameter,
so that said distal end part has a spherical shape varying in two stages.

* * * * *